Feb. 8, 1949.  H. L. BLUM  2,461,407
REMOTE CONTROL APPARATUS
Filed Oct. 21, 1944  2 Sheets-Sheet 1
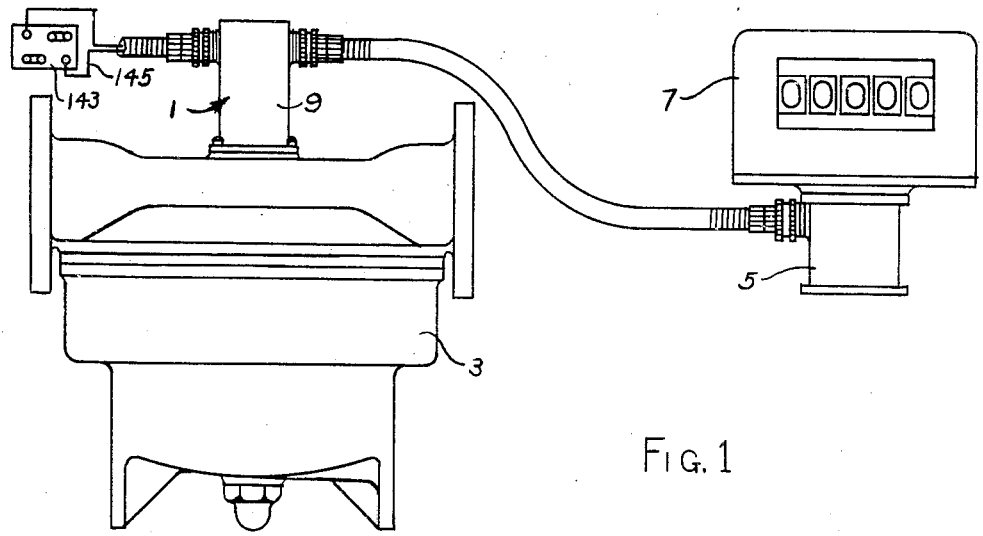
Fig. 1
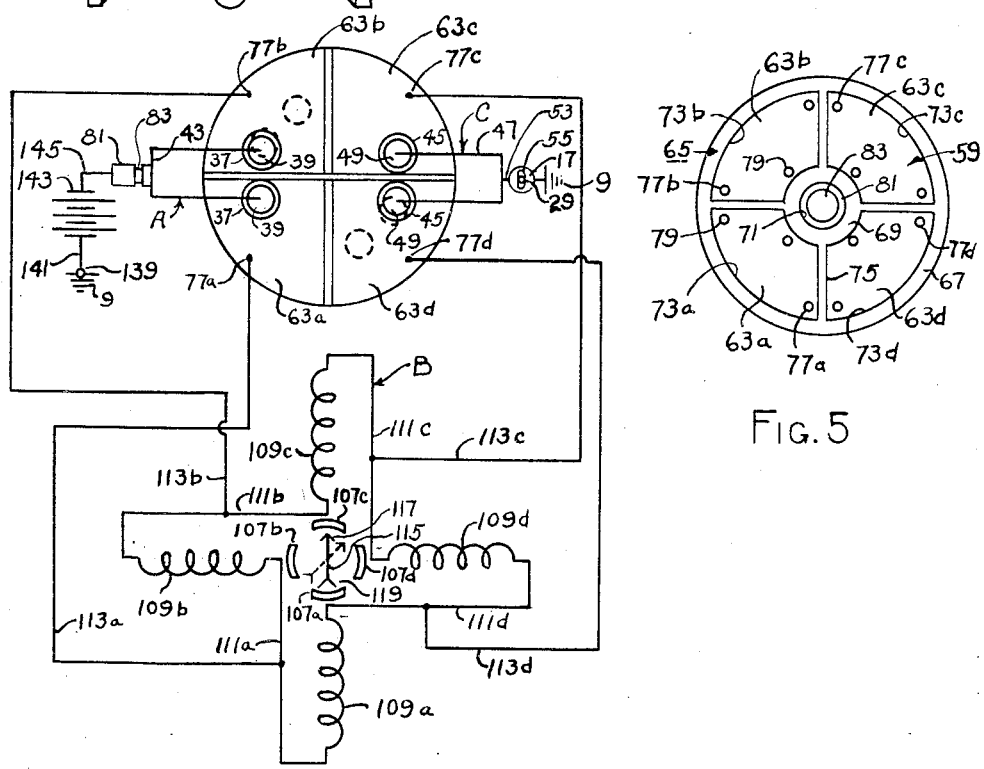
Fig. 2
Fig. 5
HOSMER L. BLUM
INVENTOR.
BY Edmund W. E. Kamm
ATTY Feb. 8, 1949.   H. L. BLUM   2,461,407
REMOTE CONTROL APPARATUS
Filed Oct. 21, 1944   2 Sheets-Sheet 2

HOSMER L. BLUM
INVENTOR.
BY Edmund W. E. Kamm
ATTY

Patented Feb. 8, 1949

2,461,407

UNITED STATES PATENT OFFICE 2,461,407

REMOTE-CONTROL APPARATUS

Hosmer L. Blum, Fort Wayne, Ind., assignor to Bowser, Inc., Fort Wayne, Ind., a corporation of Indiana Application October 21, 1944, Serial No. 559,855

2 Claims. (Cl. 318—27)

This invention relates to a remote control apparatus; more specifically, it relates to means for the transmission of motion to a remotely-located point.

In various motion-transmitting devices, it is desirable to relay, accurately, motion which originates at one point to a remote point. Frequently, it is impractical, because of structural and frictional limitations, to use a mechanical driving means between the two points. With this in mind, applicant has designed an electrical device which will transmit the motion of various mechanical devices to a remote point.

Applicant has in mind particularly the transmission of the rotary motion of a liquid meter output shaft to a register, the latter being remotely located from the meter.

Applicant's device, while not limited as to the scope of its application, may be used to advantage in many industrial installations and in airplanes, where it is desirable to install the meter adjacent the engines and the register on a dash or control panel which is convenient to the operator.

It is therefore an object of applicant's invention to provide a device which will transmit motion from a driving to a driven device.

It is another object of the invention to provide a device which will accurately transmit motion from a driving to a remotely-located driven device.

It is still another object of the invention to provide a device which will accurately transmit motion from a driving to a remotely-located driven device with a minimum of frictional power loss.

It is yet another object of the invention to provide a device which will transmit motion from a driving to a remotely-located driven device while maintaining the speed ratio between said driving and driven devices constant.

It is yet another object of the invention electrically to transmit motion from a driving device to a driven device.

These and other objects of the invention will become apparent from a study of this specification and the drawings which are attached hereto and made a part hereof, and in which:

Figure 1 is an outline showing a specific use for the device, namely, a meter, a remotely-located register, the transmitter, the receiver, and wiring between transmitter and receiver.

Figure 2 is a wiring diagram of the apparatus of Figure 1.

Figure 5 is a detail of the commutator in an inverted position.

Assembly

Applicant's device as a whole (Figure 1) is comprised of a polarity changing transmitter 1, a rotary driver 3, for the transmitter which may be a liquid meter, and receiver or motor 5 for driving register 7. The transmitter and receiver are connected by wires establishing circuits which will be later described in detail.

Transmitter

Figure 3:
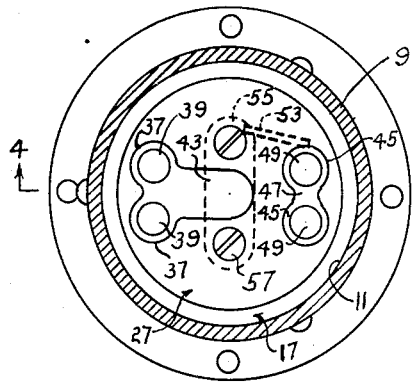
Figure 3 is a sectional view of the transmitter taken on the line 3—3 of Figure 4.
Figure 4:
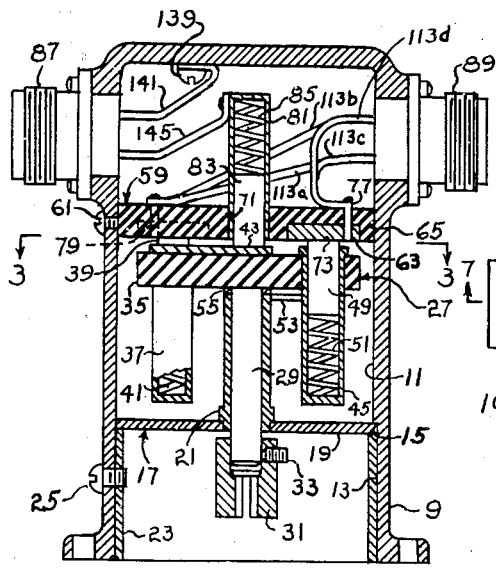
Figure 4 is a vertical section of the transmitter taken on the line 4—4 of Figure 3.

The transmitter case 9 (Figures 3 and 4) is fastened to the driver 3 by suitable means. The case has a bore 11 and a counterbore 13 forming a shoulder 15 at their junction.

A bearing plate 17 is comprised of a circular disc 19 which carries a bearing 21 at its center and is held against the shoulder 15 by a sleeve 23 which fits the counterbore and is held in place by screws 25.

Journaled in the bearing 21 is the rotary brush assembly 27, comprised of a shaft 29, a coupling 31 fixed to the lower end of the shaft by set screw 33 for engaging the output shaft (not shown) of the meter, and a disc 35 of fiber or other non-conductive material fixed to the upper end of the shaft. Disc 35 carries two brush wells 37 in which are supported brushes 39 and springs 41 for urging the brushes outward from the wells. A contact 43 on the top side of the disc leads from the center of the disc and electrically connects the wells 37. Two additional brush wells 45 are electrically connected by a conductor 47 at their upper ends and are adapted to receive brushes 49 and springs 51. A ground wire 53 leads from the conductor 47 to an elongated member 55 which is swedged to the shaft 29. The disc 35 is attached to member 55 by screws 57 and rotates with the shaft. The wells 37 are connected to the positive pole of the battery as will be described below, while the wells 45 are connected to the negative pole or are grounded.

A circular commutator 59 is inserted into bore 11 and is held in place by set screws 61 which threadedly engage tapped holes in the case and grip the edge of the commutator.

The commutator (Figure 5) is comprised of four sectors 63a, b, c, d, of copper or other electrically conductive material and each represents substantially one-quarter of a circle. A circular commutator block 65 made of an insulating material and formed with a circumferential flange 67, has a hub 69 surrounding hole 71, and recessed quadrants 73a, b, c, d, formed by separators 75 extending between the flange and the hub, for receiving the sectors. Leads 77a, b, c, d, extend from each quadrant through the commutator and along with rivets 79, maintain the segments in the recesses. A combined brush well and terminal 81 is fixed in and extends through the central hole 71 in the commutator and brush 83, urged outwardly by a spring 85 in the well, bears upon contact 43. The revolving pairs of brushes 39 and 49 are adapted to contact the commutator sectors but are spaced far enough apart so that the brushes of each pair may straddle the separators 75 so each brush may contact a different sector.

Double and quadruple pole electrical connectors 87 and 89 respectively, are suitably mounted on the transmitter case 9 for connecting wires to be later described. Wires are provided to connect the poles of the connector 87 to the case and the brush well 81, while other wires connect the poles of the connector 89 to the leads 77a, b, c, and d, all as described below.

Receiver

The receiver 5 is enclosed in a case 91 having a bore 93 and a counterbore 95. A flange 97 is provided at the bottom of the case for mounting the receiver while a flange 99 having holes 101 is provided at the top of the case for mounting a register. A four-pole connector 103 provides connections for the wiring, which will be described later.

The receiver is comprised of a circular supporting member 105 made of material such as is commonly used for electromagnets. This member has four pole pieces 107a, b, c, d, formed thereon and depending therefrom at regularly spaced intervals. Four coils 109a, b, c, d, all similarly wound, are mounted on the pole pieces 107a to d, respectively. The upper ends (outer ends on Figure 2) of coils 109a, b, c, d, are connected to the lower (inner) ends of the coils 109b, c, d, a, respectively, by wires 111a, b, c, d. Wires 113a, b, c, d, serve to connect the wires 111a, b, c, d, respectively, to the commutator sectors 63a, b, c, d, respectively, through the leads 77a, b, c, d. A permanent magnet 115 having a north pole 117 and a south pole 119 and a centrally located pole 121, is mounted to rotate in the fields of said poles as described below.

Figure 7:
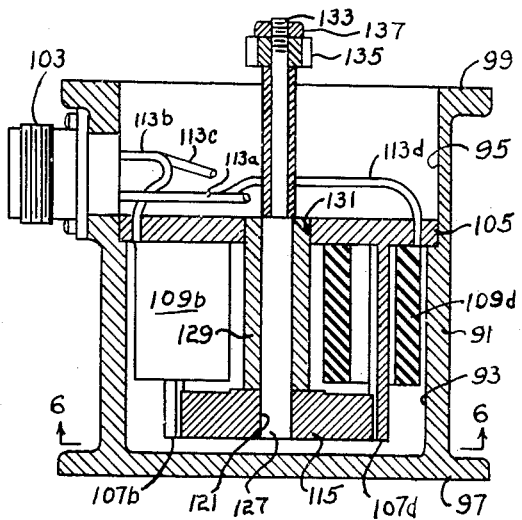
Figure 7 is an elevation, partially in section, of the receiver of Figure 6.
Figure 6:
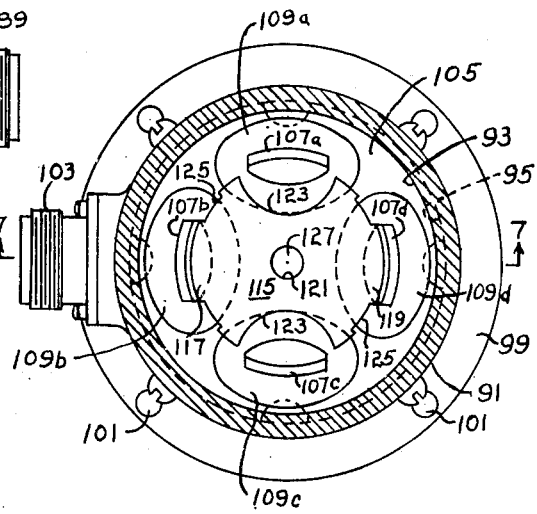
Figure 6 is a plan view of the receiver viewed from the top of Figure 7.

The magnet as shown in Figure 6 of the drawings, is notched on both sides as shown at 123 and is also notched on the pole faces as shown at 125. This notching is for the purpose of providing air gaps which will allow the magnet to be attracted and repelled more positively to produce a smoother and more accurate rotary motion. The magnet is fixed to shaft 127 (Fig. 7) which in turn is journaled in bearing 129. Bearing 129 is pressed into the centrally located hole 131 of member 105 and depends to a level below the coils to provide end clearance between the magnet and the coils and to properly position the magnet adjacent the pole pieces 107a, b, c, d.

At the end of the shaft 127, opposite the end which supports the magnet, a reduced threaded portion 133 receives and carries gear 135; the latter is held in place by nut 137 or other suitable means. Gear 135 is adapted to mesh with suitable gearing (not shown) on the register so as to drive the register in proportion to the rotation of the shaft 127.

Electrical circuits

The electrical circuit which is established in any particular position of the disc 35 will always consist of a power input section, hereinafter designated as section A and a ground section designated as section C. An intermediate section, hereinafter designated as section B, serves to connect the sections A and C, however, the path taken by the electric current through section B will be different for each 45 degrees of rotation of the disc 35 and in each position of the disc there will be at least two electrically parallel paths.

Section A comprises the ground or case 9, screw 139, wire 141, the battery 143, wire 145, terminal 81, brush 83, contact 43, brush wells 37 and brushes 39.

Section B comprises commutator sectors 63a, b, c, d, leads 77a, b, c, d, wires 113a, b, c, d, 111a, b, c, d and coils 109a, b, c, d in various combinations as described below.

Section C comprises brushes 49, wells 45, conductor 47, wire 53, member 55, shaft 29, bearing plate 17 and case 9.

Operation

Both transmitter and receiver are operable in either a clockwise or counter-clockwise direction as desired for any specific operation, the receiver following in the same direction as the transmitter and both revolving at the same speed.

In each revolution of the rotary transmitter, the brushes 39 and 49 will make eight different combinations of contacts with the four commutator sectors 63a, b, c, d and in each combination, a different polarity combination of the coils 109a, b, c, d exists.

*Position 1.*—With the parts in the positions shown by solid lines in Figure 2, the brushes 39 contact sectors 63a and 63b while brushes 49 contact sectors 63c and 63d. In this position the complete circuit established thereby is through circuit section A, thence by two parallel paths through section B into section C. The two parallel paths are through sector 63a, lead 77a, wires 113a, 111a, coil 109a, wires 111d, 113d, lead 77d, and sector 63d and through sector 63b, lead 77b, wires 113b, 111b, coil 109c, wires 111c, 113c, lead 77c and sector 63c. Thus coils 109a and 109c are energized while coils 109b and 109d have no current passing through them. The current flows through coils 109a and 109c in such a manner that the pole pieces 107a and 107c are of opposite polarity. As shown, 107c is a south pole and 107a is a north pole.

The magnet 115 assumes the position shown in solid lines in Figure 2, with the north and south poles 117 and 119 attracted by poles 107c and 107a respectively.

*Position 2.*—In this position (shown dotted in Figure 2) both brushes 39 rest on sector 63b and both brushes 49 rest on sector 63d. The electrical circuit then comprises sections A and C, which are connected through section B as follows:

From sector 63b, lead 77b, and wires 113b to wire 111b where the current divides and part of it passes through coil 109b, wire 111a, coil 109a, wire 111d where it joins the current which passes through coil 109c, wire 111c, coil 109d and the combined currents then pass by way of wire 113d, lead 77d and sector 63d to section C.

The pole pieces 107a and 107b are now converted into north poles by their respective coils while the pole pieces 107c and 107d are south poles. The resultant field is rotated 45° clockwise from the previously described position and the magnet 115 will therefore be moved 45° in a clockwise direction as shown by dotted lines in Figure 2.

*Position 3.*—In this position the brushes 39 contact sectors 63b and 63c while brushes 49 contact sectors 63a and 63d. The complete circuit thereby established is through circuit sections A and C, which are connected through section B as follows:

Through sector 63b, lead 77b, wires 113b, 111b, coil 109b, wires 111a, 113a, lead 77a and sector 63a and through sector 63c, lead 77c, wires 113c, 111c, coil 109d, wires 111d, 113d, lead 77d and sector 63d.

Thus coils 109b and 109d are energized while coils 109a and 109c have no current passing through them. The current flows through the coils in such a manner that the pole pieces 107b and 107d are north and south poles respectively.

The magnet assumes a position 90° clockwise of its original position.

*Position 4.*—The brushes 39 contact sector 63c while brushes 49 contact 63a. The completed circuit is through circuit sections A and C, which are connected through section B as follows:

Through sector 63c, lead 77c, and wires 113c, 111c, where the current divides and a part of it passes through coil 109c, wire 111b, coil 109b, wire 111a where it joins the current which passes through coil 109d, wire 111d, coil 109a and the combined currents then pass by way of wire 113a, lead 77a and sector 63a to circuit section C.

The pole pieces 107b and 107c are thus converted into north poles by their respective coils while the pole pieces 107a and 107d are south poles. The resultant field and magnet are rotated 135° clockwise from their original positions.

*Position 5.*—The brushes 39 contact sectors 63c and 63d and brushes 49 contact sectors 63a and 63b. The circuit is now established through sections A and C, connected by two parallel paths through section B as follows:

The two parallel paths are through sector 63c, lead 77c, wires 113c, 111c, coil 109c, wires 111b, 113b, lead 77b and sector 63b and through sector 63d, lead 77d, wires 113d, 111d, coil 109a, wires 111a, 113a, lead 77a and sector 63a. Coils 109a and 109c are energized while no current passes through coils 109b and 109d. Pole pieces 107a and 107c have opposite polarity, 107a is a south pole and 107c is a north pole.

The magnet therefore occupies a position 180° clockwise from its initial position.

*Position 6.*—In this position both brushes 39 rest on section 63d and both brushes 49 rest on sector 63b. The electrical circuit comprises sections A and C, which are connected through section B as follows:

From sector 63d, lead 77d, and wire 113d to wire 111d where the current divides and part of it passes through coil 109d, wire 111c, coil 109c, wire 111b where it joins the current which passes through coil 109a, wire 111a, and coil 109b. The combined currents then pass by way of wire 113b, lead 77b and sector 63b to section C.

The pole pieces 107c and 107d are now converted into north poles by their respective coils and the pole pieces 107a and 107b are converted into south poles. The resultant field and magnet 115 are rotated clockwise 225° from position 1.

*Position 7.*—In this position brushes 39 contact sectors 63a and 63d while brushes 49 contact sectors 63b and 63c. The completed circuit is through circuit sections A and C, connected by circuit section B as follows:

By two parallel paths, through sector 63d, lead 77d, wires 113d, 111d, coil 109d, wires 111c, 113c, lead 77c and sector 63c and through sector 63a, lead 77a, wires 113a, 111a, coil 109b, wires 111b, 113b, lead 77b, and sector 63b. Coils 109b and 109d are energized and no current passes through coils 109a and 109c. The flow of the current through the coils establishes pole pieces 107b as a south pole and 107d as a north pole and the field and magnet 115 will be rotated clockwise 270° from position 1.

*Position 8.*—The brushes 39 are both contacting sector 63a and the brushes 49 are both contacting sector 63c. In this position the circuit is through circuit sections A and C, connected by circuit section B as follows:

From sector 63a, lead 77a, wire 113a to wire 111a where the current divides and a part of it passes through coil 109a, wire 111d, coil 109d, and wire 111c, where it joins the current which passes through coil 109b, wire 111b and coil 109c, and the combined currents pass by way of wire 113c, lead 77c, and sector 63c to circuit section C. The pole pieces 107a and 107d are converted into north poles while pole pieces 107b and 107c are converted into south poles. The resultant field and magnet 115 are 315° clockwise from position 1.

The cycle has been traced through the eight positions in a clockwise direction looking down. The direction of rotation may be counter-clockwise, in which case the circuit for the various position will be identical, but in reverse order.

As the transmitter disc 35 revolves, a like motion is imparted to magnet 115. The gear 135 mounted on the magnet shaft 127, revolves with the magnet and can be meshed with an indicator driving gear of the desired ratio so as to advance the indicator 7 proportionately. It may of course require an idler gear between the gear 135 and the register gear in the event the direction of rotating the magnet would drive the register backwards.

It is obvious that various changes may be made in the form, structure, and arrangement of parts without departing from the spirit of the invention. Accordingly, applicant does not desire to be limited to the specific embodiment disclosed herein primarily for purposes of illustration; but instead he desires protection falling fairly within the scope of the appended claims.

What I claim to be new and desire to protect by Letters Patent of the United States is:

1. In a remote control device, the combination of a magnet having a constant polarity, means mounting said magnet for rotation about a transverse axis, a plurality of electro-magnets disposed about and adjacent to said first magnet, said first magnet adapted to be moved successively to central and intermediate positions with respect to said electro-magnets and having poles, each of which is formed with three projections, the central one to cooperate and disposed to be in aligned, closely spaced relation with one electro-magnet in the central position and the other two adapted to be aligned with two adjacent electro-magnets of like polarity in the intermediate position, a source of power, a rotating switch connected to said source and adaptable when rotated to energize said electro-magnets in predetermined order.

2. In a remote control device, the combination of a magnet having a constant polarity, means mounting said magnet for rotation about a transverse axis, a plurality of electro-magnets disposed about and adjacent to said first magnet, said first magnet having poles, each of which is formed with three projections provided with pole faces having their centers spaced radially half the radial spacing of adjacent electro-magnets to cooperate with one electro-magnet or with two adjacent electro-magnets of like polarity, a source of power, a rotating switch connected to said source and adaptable when rotated to energize said electro-magnets in predetermined order.

HOSMER L. BLUM.

REFERENCES CITED

The following references are of record in the file of this patent:

UNITED STATES PATENTS

| Number | Name | Date |
|---|---|---|
| 500,359 | Utzinger | June 27, 1893 |
| 1,492,913 | Wood | May 6, 1924 |
| 2,264,076 | Groot et al. | Nov. 25, 1941 |
| 2,327,341 | Drake | Aug. 24, 1943 |

FOREIGN PATENTS

| Number | Country | Date |
|---|---|---|
| 162,061 | Great Britain | Apr. 20, 1921 |
| 261,995 | Germany | July 4, 1913 |
| 479,177 | Germany | July 10, 1929 |